United States Patent [19]

Miller

[11] 4,251,308
[45] Feb. 17, 1981

[54] METHOD FOR MAKING A WATERMATTRESS WITH T-CORNER CONSTRUCTION

[76] Inventor: Craig S. Miller, 7688 Calle Durango, Anaheim, Calif. 92807

[21] Appl. No.: 894,500

[22] Filed: Apr. 7, 1978

[51] Int. Cl.³ .................. B31F 3/00; B29C 19/00; A47C 27/08
[52] U.S. Cl. .................. 156/211; 156/217; 156/227; 156/293; 156/145; 5/400; 5/451; 493/189; 493/218; 156/583.1
[58] Field of Search .......... 156/145, 211, 217, 218, 156/227, 293, 449–458, 198, 583.1; 229/36; 5/400; 93/8 WA, 355 B, 12 R, DIG. 1

[56] References Cited

U.S. PATENT DOCUMENTS

| 2,944,717 | 7/1960 | Lynch | 229/36 X |
|---|---|---|---|
| 3,753,823 | 8/1973 | Kuss | 156/145 |
| 3,778,852 | 12/1973 | Penn et al. | 5/371 |
| 3,840,172 | 10/1974 | Zimmermann | 229/36 |
| 3,842,455 | 10/1974 | Whitney | 5/371 |
| 3,918,110 | 11/1975 | Cantillo et al. | 5/371 |
| 3,957,557 | 5/1976 | Fraige | 156/211 |
| 4,015,299 | 4/1977 | Tinnel | 5/370 X |
| 4,025,975 | 5/1977 | Phillips et al. | 156/211 X |
| 4,055,867 | 11/1977 | Phillips | 5/371 |

*Primary Examiner*—John T. Goolkasian
*Assistant Examiner*—Lois E. Rodgers
*Attorney, Agent, or Firm*—Richard L. Myers

[57] ABSTRACT

A mattress includes a flexible tube having a pair of major surfaces alternating with a pair of side surfaces with marginal portions of the major surfaces extending beyond the side surfaces at each end of the tube. The marginal portions are bent toward each other and lap sealed along seams extending substantially between the side surfaces to form the end surfaces of the mattress. At each corner an insert is disposed along a line where the end surface approaches the side surface and is attached thereto by a continuous lap seam having substantially parallel sides extending substantially between the major surfaces. An associated method includes the provision of a special mandril for heat sealing the insert.

11 Claims, 14 Drawing Figures

U.S. Patent Feb. 17, 1981 Sheet 1 of 3 4,251,308
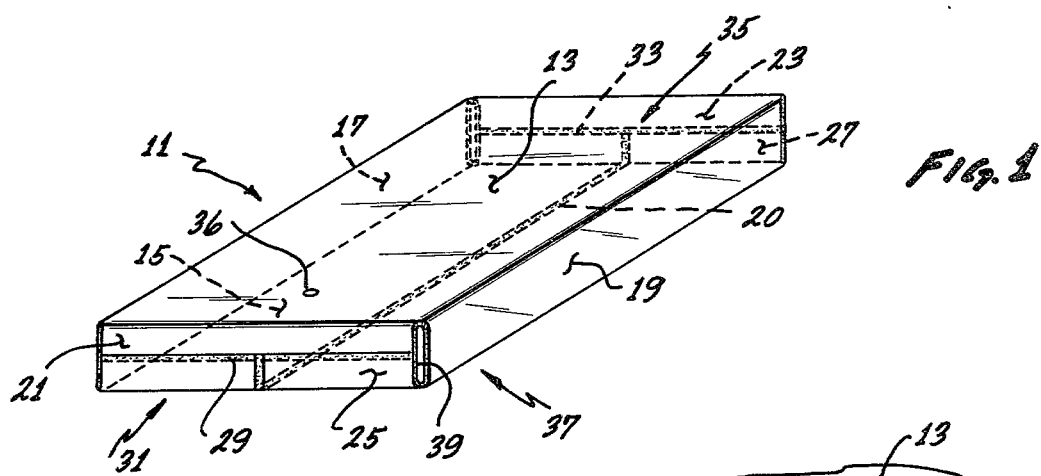
Fig. 1
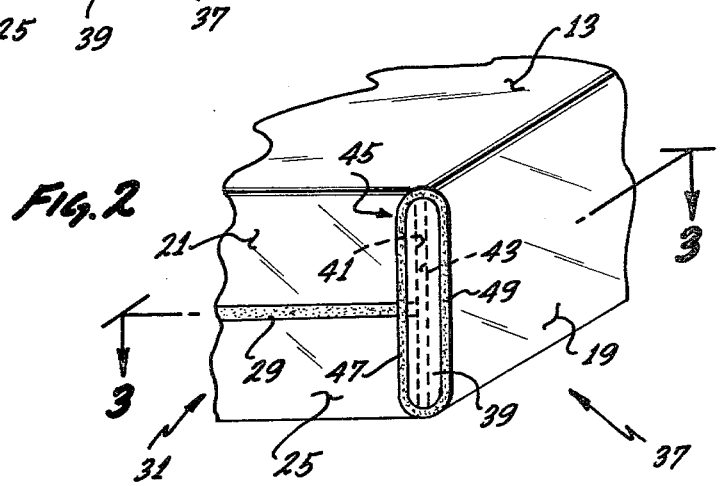
Fig. 2
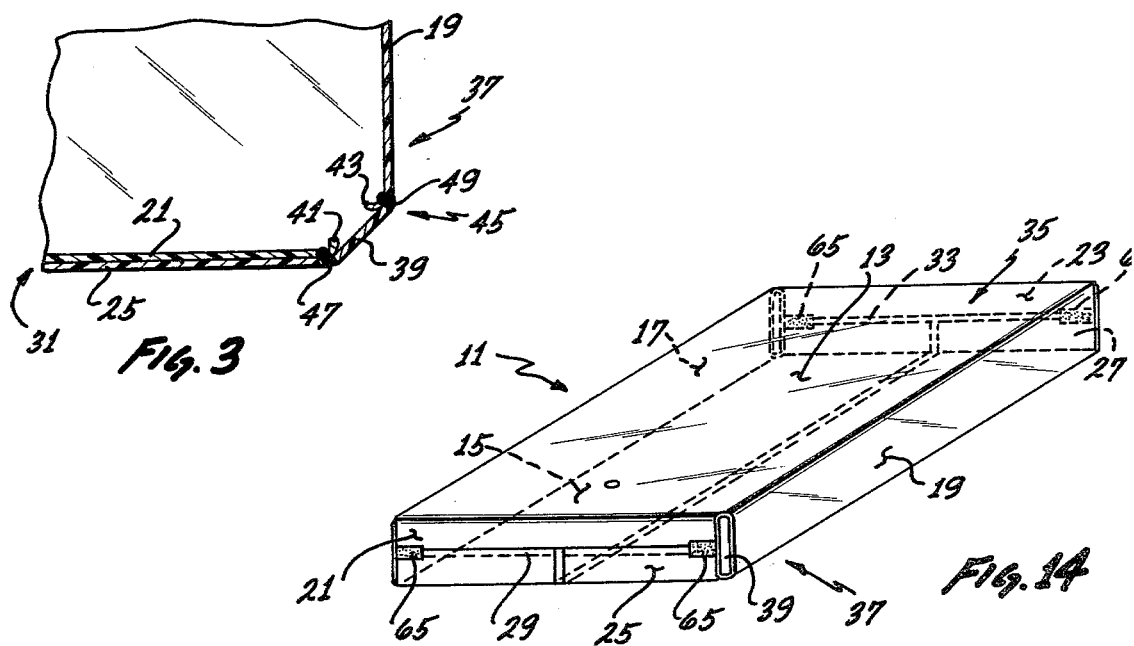
Fig. 3
Fig. 14

METHOD FOR MAKING A WATERMATTRESS WITH T-CORNER CONSTRUCTION

BACKGROUND OF THE INVENTION

1. Field of the Invention

This invention relates generally to watermattresses and their methods of construction and more specifically to that type of watermattress forming a single fluid cavity and having corner reinforcement means.

2. Prior Art Statement

As watermattresses have increased in popularity, it has become particularly desirable to devise mattresses and methods which can facilitate mass production. One step that has been taken in this effort has been to form a water bladder from substantially a single piece of material. In many of these constructions, a single piece of substantially rectangular material has been folded back on itself to form the two major surfaces of the mattress. Joining the ends of the rectangular piece has produced a desirable tubular construction. Marginal portions at the ends of the tube have been overlapped and sealed to substantially enclose the bladder with only the corners remaining to be sealed.

Unfortunately, it is the seals at the corners of such a construction which have been particularly critical. At the corners one is not dealing with merely two overlapping sheets as in most lap seam constructions. Rather, one is concerned with sealing two regions wherein three substantially perpendicular planes intersect.

In some constructions it has been found desirable to provide an insert at each of the corners in order to reinforce those regions of the mattress. Such is the case with the mattress disclosed by Kuss in U.S. Pat. No. 3,753,823. Unfortunately, the method taught by Kuss results in an exceedingly large seal at each of the corners of the mattress. Instead of reinforcing the corners, this seal appears to be smashed and tends to weaken the corners resulting in a mattress of reduced integrity.

Phillips discloses another mattress of this general type in U.S. Pat. No. 4,025,975. This mattress is also provided with a corner insert, but in this case, the insert has a rather complex seal pattern. In fact, seals must be made in four different planes of the insert; this significantly increases the complexity of construction. The method of manufacturing this mattress is further complicated by the fact that the seals associated with the insert must be made with more than one heat sealing step at each of the corners of the mattress.

Other watermattress disclosures of which the applicant is aware include the following U.S. Pat. Nos. 3,778,852, 3,842,455, 3,918,110, 4,015,299, 4,055,867.

These disclosures are not believed to be as pertinent to the instant invention as those discussed in greater detail above.

Even with these constructions of the prior art, it has remained desirable to provide a mattress which can be mass produced with a minimum of material handling and a minimum of heat sealing steps. A mattress with increased integrity is also desirable and this is typically associated with a reduced area of heat weld. The provision of a corner insert to reinforce this area of significant stress has also remained desirable.

SUMMARY OF THE INVENTION

In accordance with the present invention, a watermattress is provided with a single bladder cavity and uniquely reinforced corner regions. The method of construction is particularly simplified providing for a minimum of material handling and a reduced number of heat sealing steps. In addition, the mattress is formed with a minimum heat seal area which significantly increases the integrity of the mattress.

More specifically, the corner regions are constructed in such a manner that an insert can be applied with a single continuous lap weld in order to enforce the corner regions without producing a smashed weld of significant area.

In a preferred method, a special mandril is provided with an upwardly facing surface having an oval configuration. The mandril is so constructed that an interior slot is capable of accepting the corner region of the mattress to facilitate alignment and heat sealing of the insert.

In accordance with one aspect of the invention, the mattress includes a tube having first and second major surfaces alternating with first and second side surfaces. The first marginal portions of the first major surface and the first marginal portions of the second major surface extend beyond the side surfaces at the first end of the tube. Similarly, second marginal portions of the first major surface and second marginal portions of the second major surface extend beyond the side surfaces at the second end of the tube. A first lap seam connects the first marginal portions of the first major surface to the first marginal portions of the second major surface to form a first end surface with the first lap seam extending between the first and second side surfaces of the mattress. A second lap seam is similarly provided to connect the second marginal portions of the first and second major surfaces to form a second end surface of the mattress. A sealing means is disposed along substantially a line where one of the end surfaces approaches one of the side surfaces for sealing a corner of the mattress. A third lap seam being continuous and having first and second substantially parallel sides extends between the first and second major surfaces. A first side of the continuous seam is connected to one of the end surfaces and the second side of the continuous seam is connected to the adjacent side surface.

In accordance with a preferred method for making the mattress, a first sheet of material is provided which has a generally rectangular configuration and is defined by a pair of long sides and a pair of short sides. By sealing one of the pairs of sides to each other, a tube is formed having first and second major surfaces alternating with first and second side surfaces. By cutting a rectangular piece of material from each end of the first and second side surfaces, marginal portions of the first and second major surfaces are defined to extend between the side surfaces. By folding these marginal portions toward each other at each end of the mattress, they can be lap sealed to each other to form end surfaces each of which defines with an adjacent side surface one of the corners of the mattress.

A second piece of sheet material can be provided at each corner to close the opening between the associated end and side surfaces. Each second piece has a narrow, elongated configuration and is disposed to extend longitudinally between the first and second major surfaces. A continuous seal has one straight side for bonding the second piece to the end surface and another straight side for bonding the second piece to the associated side surface.

This construction method is particularly desirable because of the ease with which the mattress can be manufactured without sacrificing its integrity.

These and other features and advantages of the construction and method will be more apparent with a discussion of the preferred embodiments and method steps and reference to the associated drawings.

DESCRIPTION OF THE DRAWINGS

FIG. 1 is a perspective view of one form of the water-mattress of the present invention;

FIG. 2 is an enlarged fragmentary perspective view of a corner of the mattress illustrated in FIG. 1;

FIG. 3 is a top plan view of the corner taken along lines 3—3 of FIG. 2;

FIG. 14 is a perspective view of the mattress prior to final sealing of the end seams of the mattress.

DESCRIPTION OF PREFERRED EMBODIMENTS

Figure 4:
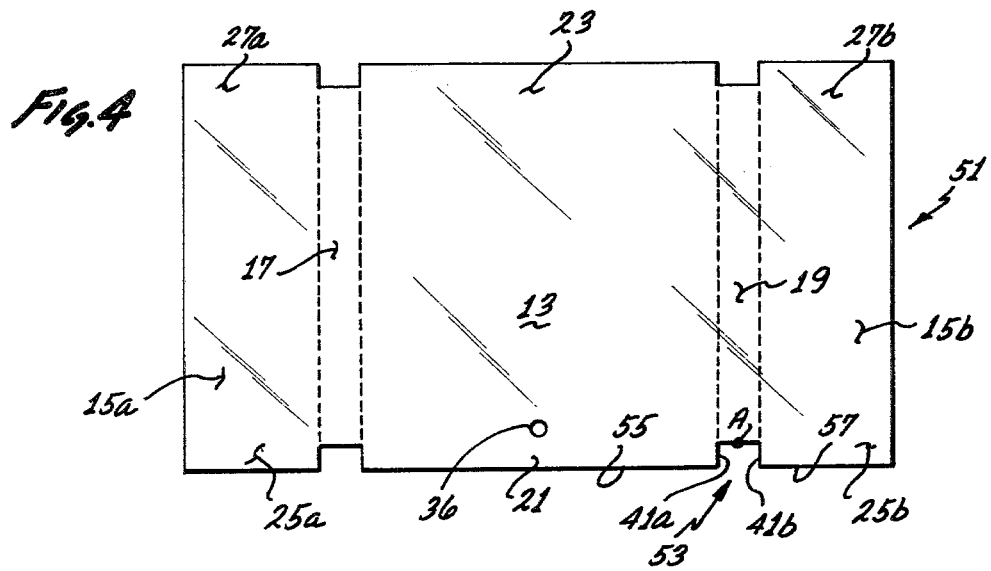
FIG. 4 is a top plan view of a major piece of material used in constructing a preferred embodiment of the mattress, the view illustrating various cut-outs associated with a preferred method of construction.

A preferred form of a mattress embodying the concepts of the present invention is illustrated in FIG. 1 and designated generally by the reference numeral 11. The mattress 11 is of the type commonly referred to as a watermattress and is designed to form a bladder for the containment of a fluid such as water. Such mattresses have enjoyed increasing popularity due primarily to the even distribution of support which they provide. This has been of interest from both comfort and therapeutic standpoints.

Mattresses of this type are commonly constructed from a heat sealable sheet material such as polyvinylchloride. In a preferred embodiment, this material has a thickness of 4 mils, but any thickness providing the mattress 11 with a desired degree of integrity would be suitable.

In this particular embodiment, the mattress 11 is formed from a tube having a pair of major surfaces 13 and 15 which are alternated with a pair of side surfaces 17 and 19. The tube can be formed from a single sheet of material having its ends joined by a lap weld 20. In the illustrated embodiment, the weld 20 is disposed centrally and longitudinally of the major surface 15.

The major surface 13 has marginal regions 21 and 23 which extend at opposite ends of the mattress 11. Similarly, the major surface 15 has marginal regions 25 and 27 which extend in proximity to the regions 21 and 23 respectively. The regions 21 and 25 are bent from the major surfaces 13 and 15, respectively, into an overlapping relationship. In the area of overlap, the regions 21 and 25 are joined by a lap weld 29 to form one end surface 31 of mattress 11. Similarly, the marginal regions 23 and 27 are bent from the major surfaces 13 and 15, respectively, into an overlapping relationship. In this area of overlap, the regions 23 and 27 are joined by a lap weld 33 to form another end surface 35 of mattress 11. The lap welds 29 and 33 extend along the length of the end surface 31 and 35, respectively, substantially between the side surfaces 17 and 19. A valve 36 is typically provided for filling the mattress 11 with water.

This embodiment of the mattress 11 has a generally orthogonal shape wherein the major surfaces 13 and 15 are substantially parallel and substantially perpendicular to the side surfaces 17, 19. With this shape, the mattress 11 has four generally square corners, one of which is designated generally in FIGS. 1, 2 and 3 by the reference numeral 37.

It is the corners, such as the corner 37, which are of particular importance to watermattresses in general and to the present construction in particular. Complex welds are required in the corner regions in order to seal the mattress. But such welds often tend to be structurally weak. Unfortunately, stresses are particularly critical in the corner regions of a watermattress. These two considerations have combined to produce mattresses which have tended to leak particularly in the corner regions.

In this particular embodiment, the corner 37 of the mattress 11 is provided with an insert 39 to reinforce the corner 37 and facilitate the formation of lap welds between the associated end surface 31 and side surface 19.

Further comments relating to the corner 37 and the insert 39 will be made with reference to the associated end surface 31 and side surface 19. It will be understood however, that an insert, such as the insert 39, is provided at each of the corners of the mattress 11 and its relationship with respect to the associated end surfaces 31, 33 and side surfaces 17, 19 will be as described with reference to the corner 37.

The insert 39 can be formed from the same material as the tube. In the illustrated embodiment, the insert 39 has a generally narrow, longitudinal configuration wherein the length of the insert 39 is substantially equal to the desired height of the mattress 11. The insert 39 is configured to extend with its length perpendicular to the major surfaces 13 and 15 and its width extending between the end surface 31 and the side surface 19.

The insert 39 is preferably positioned to extend between the major surfaces 13 and 15 with one of its long sides overlapping a vertical edge 41 of the end surface 31 and the other of its long sides overlapping a vertical edge 43 of the side surface 19. In this position, the periphery of the insert 39 can be connected by a lap weld 45 to the end surface 31 and the side surface 19.

The lap weld 45 is of particular importance to the present invention. In the illustrated embodiment, the weld 45 is a continuous weld having a generally oval configuration. The oval has two sides which form generally straight lines extending substantially the entire distance between the major surfaces 13 and 15. One side of the oval weld 45 connects the insert 39 in an overlapping configuration to the end surface 31. The other side of the oval weld 45 connects the insert 39 in an overlapping configuration to the side surface 19. As illustrated in FIG. 2, the sides of the oval weld 45 can be substantially parallel.

It is particularly desirable that the edges 41 and 43 of the surfaces 31 and 19, respectively, are not directly connected to each other. To do so would put an excess of material into the weld region and thereby decrease the strength of the corner 37. The top view of FIG. 3 illustrates that these edges 41 and 43 of the surfaces 31 and 19, respectively, are preferably free; and their associated surfaces 31 and 19 are joined by the insert 39 and the associated continuous lap weld 45.

In the preferred method of construction, the tube of the mattress 11 can be formed from a single sheet 51 of the material which can be cut in the general shape illustrated in FIG. 4. In this embodiment of the invention, the sheet 51 has a rectangular configuration and is cut on two of its parallel edges to form four cut-outs, one of which is designated generally by the reference numeral 53. The cut-outs, such as the cut-out 53, appear at the corners of the mattress 11 and define the marginal regions 21, 23 and 25, 27, respectively of the major surfaces 13 and 15.

In FIG. 4, the major surface 15 is formed by the ends of the sheet 51 designated by the reference numerals 15a and 15b. These ends 15a and 15b are overlapped at their edges to form the lap weld 20 best illustrated in FIG. 1. The marginal region 25 is comprised of regions 25a and 25b of the sheet 51, and the marginal region 27 is comprised of the regions 27a and 27b of the sheet 51.

Figure 5:
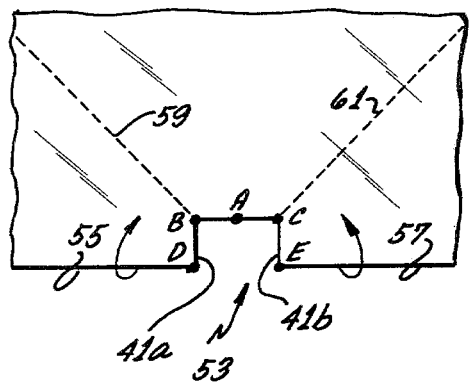
FIG. 5 is an enlarged fragmentary top plan view of one of the cut-out regions shown in FIG. 4.

The particular cut-out 53 is illustrated in greater detail in FIG. 5. This cut-out 53 has a generally rectangular configuration with its corners defined by the points B, C, D and E. The letter A designates the midpoint between the points B and C. It will be noted that the points B and D define an edge 41a and the points C and E define an edge 41b which ultimately combine to form the edge 41 previously discussed. Also, the points B, A and C define an edge previously designated by the reference numeral 43.

On either side of the cut-out 53, the sheet 51 is defined by a pair of edges 55 and 57. A pair of imaginary lines 59 and 61 diverge at approximately 45 degree angles to the edges 55, 57, respectively, from the points B and C respectively.

In a preferred method, the formation of the corner 37 can be accomplished as follows. The sheet 51 can be bent along the line 61 so that the edge of the cut-out 53 defined by the points C, E coincides with the edge defined by the points C, A. Similarly, the sheet 51 can be bent along the line 59 so that the edge of the cut-out 53 defined by the points B, D coincides with the edge defined by the points B, A. Preferably, the sum of the distances C E and B D exceed the distance B C so that the edges 55 and 57 overlap as illustrated in FIG. 6.

Figure 6:
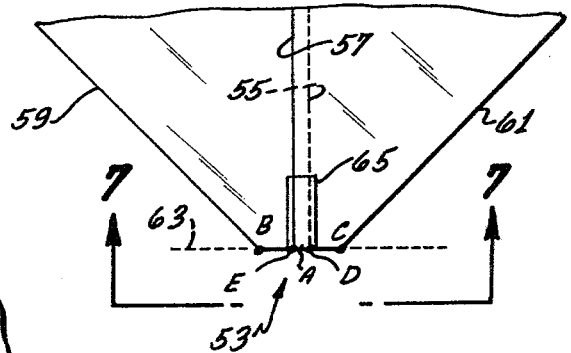
FIG. 6 is a top plan view of the cut-out region illustrated in FIG. 5, the view showing a folding and sealing step associated with a preferred method of construction.

It is of particular interest to note with reference to FIG. 6 that the cut-out 53 need not be made prior to the folding of the sheet 51 along the imaginary lines 59 and 61. Rather, the cut-out 53 can be made by a single cut (illustrated by the dotted line 63) along a straight line defined by the points B, E, A, D and C. This step can greatly simplify the construction of the mattress because the obvious reduction of effort at one corner is appreciated at each corner of the mattress 11. In still a further embodiment and method of the invention, it will be illustrated that the cut-outs, such as the cut-out 53, can be eliminated entirely without sacrificing any of the advantages associated with this mattress construction.

Figure 7:
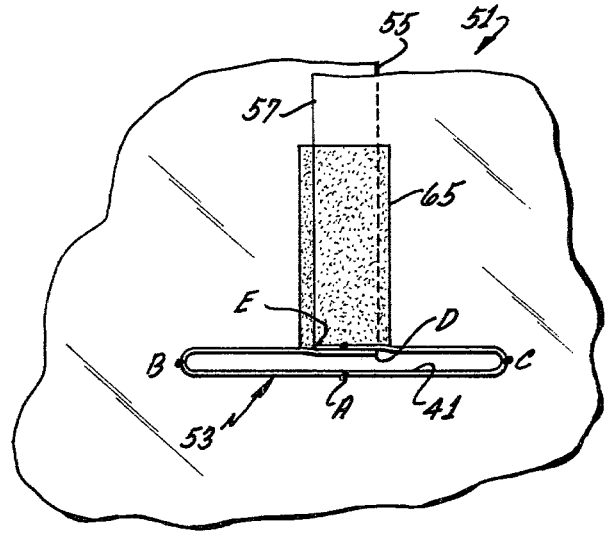
FIG. 7 is a fragmentary front elevational view taken along lines 7—7 of FIG. 6.

After the folds have been made along the imaginary lines 59 and 61, it is desirable to connect the overlapping edges 55 and 57 in proximity to the cut-out 53 by means of a short lap weld 65. The purpose of the weld 65 is to maintain the sheet 51 in the folded configuration. Once the weld 65 has been completed, the cut-out 53 can be provided with a generally oval shape as illustrated in FIG. 7.

Figure 8:
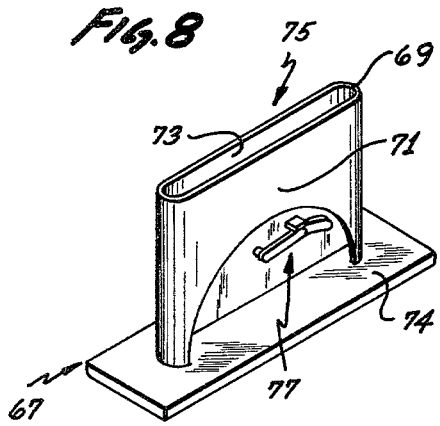
FIG. 8 is a perspective view of a mandril particularly adapted for use in a preferred method of constructing one embodiment of the present invention.
Figure 9:
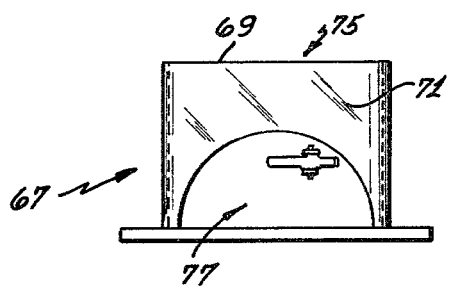
FIG. 9 is a front elevational view of the mandril illustrated in FIG. 8.
Figure 10:
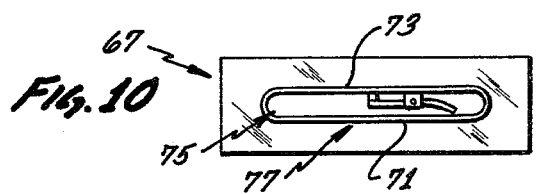
FIG. 10 is a top plan view of the mandril illustrated in FIG. 8.
Figure 11:
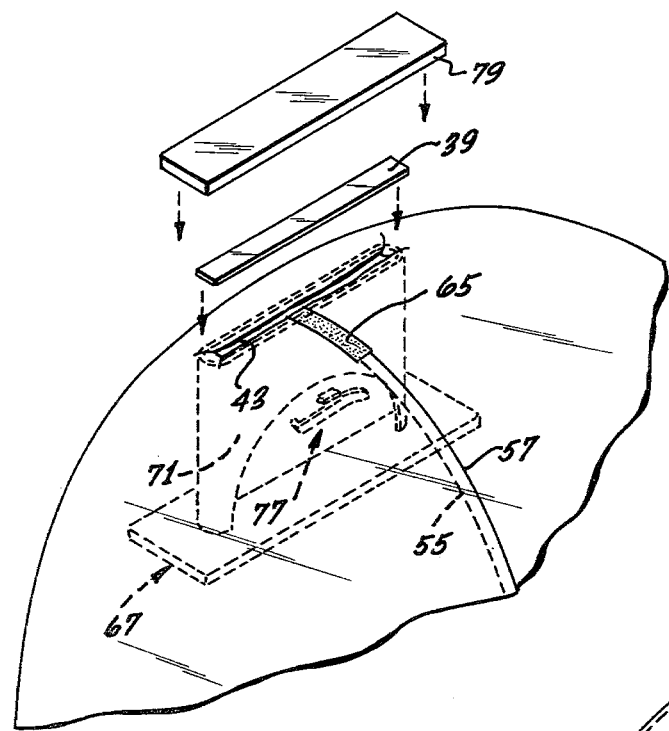
FIG. 11 is a perspective view of a method step wherein the corners of the mattress are reinforced by an insert in one embodiment of the invention.

A further step in the preferred method of construction is enhanced by use of a mandril such as that designated generally by the reference numeral 67 in FIGS. 8, 9 and 10. Depending on the particular embodiment of the invention, the mandril 67 preferably provides an upwardly facing surface 69 disposed in a generally horizontal plane. This surface 69 is to be used in conjunction with conventional heat sealing apparatus (not shown) to form the continuous weld 45 previously discussed. In the illustrated embodiment of the mandril 67, the surface 69 is formed by two upstanding generally planar members 71 and 73 supported on a base 74. These members 71 and 73 are separated slightly to form a slot 75 and are joined at their lateral edges to form the arcuate ends of the oval.

It will be noted that the planar member 71 is cut out in its lower region to expose an overcenter pressure device 77. This device 77 is mounted on the planar member 73 and is designed to be operable to exert a pressure on the inner surface of the member 73.

The mandril 67 is particularly adapted for use in mounting the insert 39 and forming the weld 45 at the corner 37 of the mattress 11. The sheet 51, constructed as illustrated in FIG. 7, can be placed over the mandril 67 with the oval opening positioned over the surface 69 and the edges 41 and 43 which define the opening tucked into the slot 75. With the sheet 51 mounted over the mandril 67 in this manner, the insert 39 can be laid over the sheet 51 on the top of the surface 69 of the mandril 67. A heat seal die 79 can then be positioned over the insert 39 and operated with conventional heat sealing apparatus to form the continuous lap weld 45. It will be noted that the surface 69 appears as a line in FIG. 9. It follows that the surface 69 is planar and that the entire continuous weld 45 is in substantially the same plane when it is formed by the surface 69. In a preferred method of construction, this heat sealing step completes formation of the corner 37 of the mattress 11.

Figure 12:
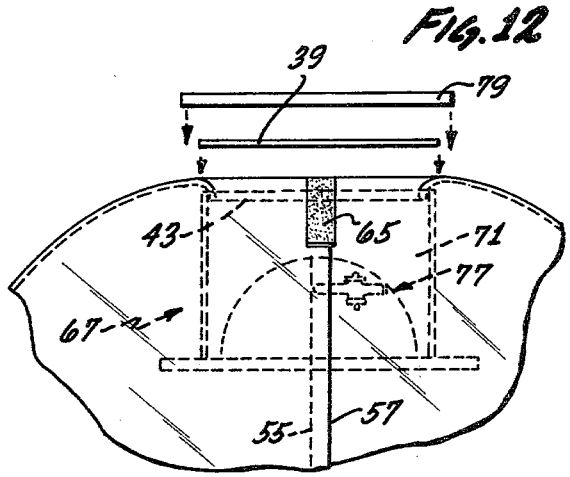
FIG. 12 is a front elevational view of the method step illustrated in FIG. 11.
Figure 13:
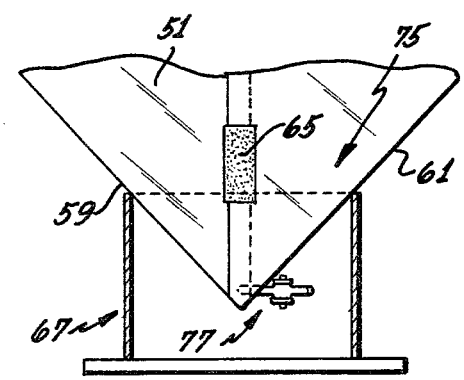
FIG. 13 is a front elevational view of a method step wherein the corners of the mattress are reinforced by an insert in another embodiment of the invention.

In another form of construction of the present invention, the cut-outs, such as the cut-out 53, need not be cut from the sheet 51. Rather, the folded triangular configuration, as illustrated in FIG. 6, can be made without removing the apex of the triangle. In other words, the sheet 51 can be left in the triangular configuration as illustrated in FIG. 13. In such a method of construction, the overcenter pressure device 77 is of particular advantage. With the apex of the folded sheet 51 inserted into the slot 75 of the mandril 67, the device 77 can be operated to engage the apex of the triangle. Then the sides of the sheet 51 can be folded over the mandril 67, as illustrated in FIG. 12 to facilitate application of the insert 39 and formation of the continuous weld 45.

If desired, the apex of the welded corner can be cut off after it is removed from the mandril 67. On the other hand, since the apex will merely extend into the cavity of the mattress 11, it does not hinder the construction to leave it attached.

After the insert 39 has been attached and the continuous lap weld 45 has been completed at each corner, the mattress 11 will be in a configuration such as that illustrated in FIG. 14 with only the longitudinal lap welds 29 and 33 remaining to be formed. This can be accomplished in a conventional manner. For example, the lap weld 29 can be formed by joining the short welds 65 at opposite ends of the end surface 31. Similarly, the lap weld 33 can be formed by joining the short welds 65 at opposite ends of the end surface 35.

Although the mattress 11 has been described and illustrated with reference to an embodiment wherein the side surfaces 17 and 19 are longer than the end surfaces 31 and 35, it will be appreciated that these relative dimensions can be reversed. The illustrated embodiment may be more desirable however since it reduces the number of linear feet of lap weld and thereby increases the integrity of the mattress 11. Other embodiments can be produced by retaining the cut-outs 53 with the sheet 51 and constructing the corners as illustrated in FIG. 13. In different methods of construction, the cut-out 53 can be cut from the rectangular sheet 51, as illustrated in FIG. 4, or removed with a single straight cut after the sheet 51 has been folded, as illustrated in FIG. 6.

The preferred method is facilitated by use of the mandril 67. However, it will be appreciated that other forms of the mandril can be used all within the scope of the invention.

The disclosed method is particularly desirable since it maximizes geometrical considerations in cutting the sheet 51. Also, by providing the mandril 67 as disclosed and inserting the sheet 51 into the slot 75, the edges 43 and 41 can remain free but enclosed by the continuous lap weld 45.

Other modifications of the apparatus and method of construction will be apparent to those skilled in the art so that the scope of the invention should be ascertained only with reference to the following claims.

1. A method for making a mattress comprising the steps of:
   providing a first piece of sheet material having a generally rectangular configuration defined by a pair of long edges and a pair of short edges;
   sealing one of the pairs of edges to each other along a first seam to form a tube having first and second major surfaces alternating with first and second side surfaces;
   removing portions of the first and second side surfaces to define marginal portions of the first and second major surfaces at the ends of the mattress;
   folding into an overlapping relationship the marginal portions of the first and second major surfaces at one of the ends of the mattress;
   sealing the overlapping marginal portions of the first and second major surfaces to each other along a second seam to form a first end surface of the mattress, the first end surface extending into close proximity to the first side surface at a particular corner of the mattress, and defining an opening therebetween, said opening extending at least a portion of the distance between the first and second major surfaces;
   providing a second piece of the sheet material having an elongated configuration;
   sealing the second piece of sheet material to the first piece of sheet material over said opening along a continuous seam, the continuous seam having first portions connecting the second piece of sheet material to the first end surface and having second portions disposed in substantially the same plane as the first portions and connecting the second piece of sheet material to the first side surface of the mattress.

2. The method recited in claim 1 wherein during the last mentioned sealing step, the first portions of the continuous seam are formed substantially parallel to the second portions of the continuous seam.

3. A method for making a mattress having first and second major surfaces alternating with first and second side surfaces and extending generally between first and second ends of the mattress, the method comprising the steps of:
   providing a first piece of sheet material having a generally rectangular configuration defined by a pair of long edges and a pair of short edges;
   sealing one of the pairs of edges to each other along a first seam to form the first and second major surfaces and the first and second side surfaces of the mattress at the first end of the mattress;
   folding into an overlapping relationship the first and second major surfaces at the first end of the mattress;
   sealing the overlapping first and second major surfaces to form a second seam extending in close proximity to the first side surface at a particular corner of the mattress, and defining an opening therebetween, said opening extending at least a portion of the distance between the first and second major surfaces;
   providing an insert;
   positioning the insert in overlapping relationship with said opening and the first end surface and the first side surface of the mattress; and
   sealing the insert to the first piece of sheet material over said opening along a continuous seam having first portions connecting the insert to the first end surface and having second portions disposed in substantially the same plane as the first portions and connecting the insert to the first side surface at the particular corner of the mattress.

4. The method recited in claim 3 wherein the first portions of the continuous seam are substantially parallel to the second portions of the continuous seam.

5. A method for closing a corner of a watermattress including the steps of:
   providing a mattress bladder having at the corner thereof an end surface and a side surface both of said surfaces extending between first and second major surfaces, the end surface extending into proximity with the side surface and defining with the side surface an opening extending at least a portion of the distance between the first and second major surfaces;
   providing an insert; and
   sealing the insert over the opening along a continuous seam having first portions connecting the insert to the end surface and second portions disposed in substantially the same plane as the first portions and connecting the insert to the side surface of the mattress.

6. The method recited in claim 5 wherein the sealing step further comprises the step of positioning the insert exteriorly of the mattress bladder and opening.

7. The method recited in claim 5 wherein the first portions of the seam are substantially parallel to the second portions of the seam.

8. The method recited in claim 5 wherein the sealing step further comprises the steps of:
- providing a mandrel having generally upstanding members extending to an upwardly facing surface and being separated to form a slot therebetween, the upwardly facing surface of the mandrel having the configuration of the continuous seam;
- positioning in the slot of the mandrel those portions of the side surface and end surface which define the opening;
- placing the insert over the upwardly facing surface of the mandrel in contact with the side surface and end surface of the mattress; and
- heat sealing the insert to the side surface and end surface of the mattress to form the continuous seam around the opening.

9. A method for closing a corner of a watermattress including the steps of:
- providing a mattress bladder having walls formed of heat sealable material which define at least one corner of the bladder, and portions of the walls of the bladder defining an opening at the corner;
- providing a mandrel having upstanding members extending to a particular surface having a predetermined planar configuration, the members of the mandrel being separated to form a slot therebetween;
- inserting into the slot of the mandrel those portions of the walls of the bladder which define the opening;
- providing a patch of heat sealable material;
- placing the patch over the particular surface of the mandrel in contact with the walls of the bladder; and
- heat sealing the patch to the walls of the bladder to form a continuous seal around the opening.

10. The method recited in claim 9 wherein the configuration of the continuous seal is substantially the predetermined configuration of the particular surface of the mandrel.

11. The method recited in claim 9 or claim 10 wherein the predetermined configuration has the shape of an oval.

* * * * *